US009483779B2

(12) United States Patent
Gupta et al.

(10) Patent No.: US 9,483,779 B2
(45) Date of Patent: *Nov. 1, 2016

(54) RELEVANT CONTENT DELIVERY

(71) Applicant: QUALCOMM Incorporated, San Diego, CA (US)

(72) Inventors: Prince Gupta, San Diego, CA (US); Aniket A. Vartak, San Diego, CA (US); Charles Wheeler Sweet, San Diego, CA (US); Robert S. Tartz, San Marcos, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/635,727

(22) Filed: Mar. 2, 2015

(65) Prior Publication Data

US 2015/0170220 A1     Jun. 18, 2015

Related U.S. Application Data

(63) Continuation of application No. 13/863,714, filed on Apr. 16, 2013, now Pat. No. 8,971,861, which is a continuation of application No. 13/222,615, filed on Aug. 31, 2011, now Pat. No. 8,442,500.

(60) Provisional application No. 61/499,596, filed on Jun. 21, 2011.

(51) Int. Cl.
*H04M 3/42*     (2006.01)
*G06Q 30/02*     (2012.01)

(52) U.S. Cl.
CPC .......... *G06Q 30/0269* (2013.01); *G06Q 30/02* (2013.01); *G06Q 30/0267* (2013.01)

(58) Field of Classification Search
CPC .......................... H04W 64/00; A61N 1/36564
USPC ............... 600/301, 347, 345, 365, 300, 523; 370/241; 455/41.2, 414.1; 713/323
See application file for complete search history.

(56) References Cited

U.S. PATENT DOCUMENTS 6,904,408 B1    6/2005   McCarthy et al.
7,073,129 B1    7/2006   Robarts et al.
(Continued)

FOREIGN PATENT DOCUMENTS

JP     2001344352 A    12/2001
JP     2005332084 A    12/2005
(Continued)

OTHER PUBLICATIONS

International Search Report and Written Opinion—PCT/US2012/041612—ISA/EPO—Apr. 30, 2013.
(Continued)

*Primary Examiner* — Kiet Doan
(74) *Attorney, Agent, or Firm* — Kilpatrick Townsend & Stockton LLP

(57) ABSTRACT

Various arrangements for delivery of relevant content to a mobile device of a user are presented. Physiological state data and image data related to the user of the mobile device may be received by a host computer system from a mobile device. The image data may be analyzed to identify a characteristic of the image. The physiological state data may also be analyzed. Content to deliver to the mobile device of the user may be selected at least partially based on the physiological state data of the user and the characteristic of the image. The content may be transmitted to the mobile device.

32 Claims, 10 Drawing Sheets

(56) References Cited

U.S. PATENT DOCUMENTS

| | | | |
|---|---|---|---|
| 8,109,874 B2 | 2/2012 | Kong et al. | |
| 8,138,930 B1 | 3/2012 | Heath | |
| 8,442,500 B2 | 5/2013 | Gupta et al. | |
| 8,971,861 B2 | 3/2015 | Gupta et al. | |
| 2005/0249239 A1 | 11/2005 | Pierce et al. | |
| 2008/0109317 A1 | 5/2008 | Singh | |
| 2008/0113654 A1 | 5/2008 | Miyazawa | |
| 2008/0154098 A1* | 6/2008 | Morris | A61B 5/02416 600/300 |
| 2009/0316951 A1 | 12/2009 | Soderstrom | |
| 2010/0106627 A1 | 4/2010 | O'Sullivan et al. | |
| 2010/0121716 A1 | 5/2010 | Golan | |
| 2011/0004072 A1* | 1/2011 | Fletcher | A61B 5/0002 600/300 |
| 2011/0039522 A1 | 2/2011 | Partridge et al. | |
| 2011/0099071 A1 | 4/2011 | Johnson | |
| 2011/0128146 A1 | 6/2011 | Hsueh et al. | |
| 2011/0196758 A1 | 8/2011 | Smith | |
| 2011/0263946 A1* | 10/2011 | el Kaliouby | A61B 5/1128 600/300 |
| 2012/0130796 A1 | 5/2012 | Busch | |
| 2012/0149395 A1 | 6/2012 | Azami et al. | |

FOREIGN PATENT DOCUMENTS

| | | |
|---|---|---|
| JP | 2008009501 A | 1/2008 |
| JP | 2010277370 A | 12/2010 |
| JP | 2011023896 A | 2/2011 |
| JP | 2011040063 A | 2/2011 |
| KR | 20100008071 A | 1/2010 |
| WO | WO-2011021285 A1 | 2/2011 |

OTHER PUBLICATIONS

Supplementary European Search Report—EP12728902—Search Authority—Munich—Nov. 17, 2014.

Zhang, D et al., "User-Centered Context-Aware Mobile Application—The Next Generation of Personal Mobile Computing," Communications of the Association for Information Systems, vol. 24, No. 1, Article 3, pp. 27-46, Jan. 2009.

* cited by examiner

| User Device Identifier | User | Home Zipcode | Work Zipcode | Age Group | Commuter? | Typical Physiological State |
|---|---|---|---|---|---|---|
| 3035552918 | J. Baas | 80204 | 80244 | 21-31 | Yes | Thirsty |
| 9786137122 | B. Hogan | 01852 | - | 21-31 | No | Sad |
| 6034721981 | M. Salle | 80304 | 80303 | 65+ | Yes | Stressed |
| 9015551234 | T. Wholey | 90211 | 90211 | 41-51 | Yes | Thirsty |
| 6175552727 | K. Smith | 01002 | 01003 | 51-61 | Yes | Excited |
| 5084587093 | J. Blake | 20933 | 20933 | 21-31 | Yes | Angry |
| 5081371213 | C. Crisp | 90221 | 90212 | 31-41 | Yes | Stressed |

FIG. 3B

| Content Identifier | Content Provider | Minimum Cost | Maximum Cost | Deliveries | Confirmed Presentations |
|---|---|---|---|---|---|
| 1 | MegaDrink Co. | 0.01 | 0.03 | 234 | 201 |
| 2 | MegaDrink Co. | 0.01 | 0.02 | 332 | 332 |
| 3 | MegaDrink Co. | 0.01 | 0.03 | 270 | 222 |
| 4 | ABC Bar | 0.05 | 0.08 | 110 | 88 |
| 5 | 123 T-Shirt Inc. | 0.02 | 0.03 | 65 | 63 |
| 6 | CameraPlus Inc. | 0.11 | 0.42 | 27 | 22 |
| 7 | Massage Provider | 0.07 | 0.15 | 8 | 7 |

FIG. 3C

RELEVANT CONTENT DELIVERY

CROSS REFERENCES TO RELATED APPLICATIONS

This application is a continuation of U.S. patent application Ser. No. 13/863,714 filed Apr. 16, 2013 and entitled "Relevant Content Delivery", which is a continuation of U.S. patent application Ser. No. 13/222,615, filed Aug. 31, 2011, now U.S. Pat. No. 8,442,500, issued May 14, 2013, and entitled "Relevant Content Delivery", which claims priority from U.S. Provisional Patent Application Ser. No. 61/499,596, filed Jun. 21, 2011, entitled "Relevant Content Delivery." The entire contents of the previous applications are incorporated herein by reference for all purposes.

BACKGROUND

The more closely related content, such as an advertisement, is to a person's interests, the person's activities, the person's location, and/or the person's state of mind, the more likely the person will be interested in and/or influenced by the content. Typically, content may be tailored to a user of a mobile device based on the user's interactions with a mobile device. The user may provide various forms of "active" input, such as search strings or other input via a keypad or pointing device, to an Internet browser being executed on the mobile device, upon which content may be based. For example, a user may enter a search string for "local golf courses." In response, a search engine executed on the mobile device may return search results accompanied by content, such as an advertisement for golf clubs.

SUMMARY

Systems, methods, apparatuses, and computer readable mediums are disclosed herein for delivering content to a mobile device of a user. In an example of a method, a method for delivery of relevant content to a mobile device of a user is presented. The method may include receiving, by a host computer system, from the mobile device, physiological state data collected from the user of the mobile device captured at a time. The method may include receiving, by the host computer system, image data based on an image captured by the mobile device, wherein the image was captured at least approximately at the time. The method may include analyzing, by the host computer system, the image data to identify a characteristic of the image. The method may include analyzing, by the host computer system, the physiological state data collected from the user of the mobile device. The method may include selecting, by the host computer system, content to deliver to the mobile device of the user at least partially based on the physiological state data collected from the user and the characteristic of the image, wherein the content is selected from a plurality of content. The method may include transmitting, by the host computer system, the content to the mobile device.

Embodiments of such a method may include one or more of the following: The method may include determining, by the host computer system, a price for presenting the content related to the physiological state data collected from the user and the characteristic of the image to the user, wherein the price is to be charged to a content provider associated with the content. The content may be linked with an ideal physiological state. The price for presenting the content may be higher the more likely the physiological state data collected from the user indicates the ideal physiological state. The content may comprise one or more advertisements. The method may include receiving, by the host computer system, from the mobile device, a location of the user, wherein the location was determined at least approximately at the time of a measurement of the physiological state data of the user, wherein: selecting, by the host computer system, content to deliver to the mobile device is additionally at least partially based on the location of the user. The content selected for the mobile device may be further based on one or more stored characteristics of the user accessible by the host computer system. The method may include selecting, by the host computer system, content to deliver to the mobile device of the user comprises: selecting, by the host computer system, a content category using the characteristic of the image; and selecting, by the host computer system, the content from the content category using the physiological state data collected from the user. The time may be a period of time.

In an example of a method, a method for delivering content to a user of a mobile device is presented. The method may include capturing, by the mobile device, an image at a time. The method may include storing, by the mobile device, image data based on the image. The method may include capturing, by the mobile device, physiological state data from the user of the mobile device, wherein the physiological state corresponds at least approximately to the time. The method may include transmitting, by the mobile device, the physiological state data and image data to a host computer system. The method may include receiving, by the mobile device, from the host computer system, content selected using the physiological state data and the image data. The method may include presenting, by the mobile device, the content selected using the physiological state data of the user and the image data to the user.

Embodiments of such a method may include one or more of the following: The method may include storing, by the mobile device, the content received from the host computer system. The method may include receiving, by the mobile device, a trigger action from the user, wherein the trigger action is predefined to initiate presentation of the content to the user, wherein presenting, by the mobile device, the content selected using the physiological state data and the image data to the user is triggered by the trigger action. The method may include selecting, by the host computer system, content to deliver to the mobile device of the user using the physiological state data and the image data. Selecting, by the host computer system, content to deliver to the mobile device of the user may comprise: selecting, by the host computer system, a content category using the image data; and selecting, by the host computer system, the content from the content category using the physiological state data. The content may comprise an advertisement. Presenting, by the mobile device, the content related to the physiological state data and the image data to the user may comprise using an augmented reality display. The physiological state data may comprise heart rate data, heart rate variability data, skin conductance level data, number of electrodermal responses data, or change in skin temperature data. Capturing, by the mobile device, the physiological state data of the user of the mobile device may comprise using one or more biomedical sensors selected from a group consisting of: electrocardiogram (ECG) sensors, galvanic skin response (GSR) sensors, plethysmography (PPG) sensors, skin temperature sensors (SKT), and electromyogram (EMG) sensors. The method may include determining, by the mobile device, a location of the user, at least approximately at the time of capturing the physiological state data of the user. The method may include transmitting by the mobile device, the location of the user to the host computer system. The content received by the mobile device may be additionally based on the location of the user. The time may be a period of time.

In an example of a computer program product, a computer program product residing on a non-transitory processor-readable medium and comprising processor-readable instructions is presented. The computer program product may comprise instructions configured to cause a processor to cause physiological state data of a user of a mobile device captured at a time to be received from the mobile device. The computer program product may comprise instructions configured to cause a processor to cause image data based on an image captured by the mobile device to be received from the mobile device, wherein the image was captured at least approximately at the time. The computer program product may comprise instructions configured to cause a processor to analyze the image data to identify a characteristic of the image. The computer program product may comprise instructions configured to cause a processor to analyze the physiological state data of the user of the mobile device. The computer program product may comprise instructions configured to cause a processor to select content to deliver to the mobile device of the user at least partially based on the physiological state data of the user and the characteristic of the image, wherein the content is selected from a plurality of content. The computer program product may comprise instructions configured to cause a processor to cause the content to be transmitted to the mobile device.

Embodiments of such a computer program product may include one or more of the following: The computer program product may comprise instructions configured to cause a processor to determine a price for presenting the content related to the physiological state data of the user and the characteristic of the image to the user, wherein the price is to be charged to a content provider associated with the content. The content may be linked with an ideal physiological state. The price for presenting the content may be higher the more likely the physiological state data of the user indicates the ideal physiological state. The content may comprise one or more advertisements. The computer program product may comprise instructions configured to cause a processor to cause a location of the user to be received from the mobile device, wherein the location was determined at least approximately at the time. The processor-readable instructions that cause the processor to select content to deliver to the mobile device may additionally use the location of the user. The content selected for the mobile device may be further based on one or more stored characteristics of the user. The processor-readable instructions that cause the processor to select content to deliver to the mobile device of the user may comprise additional processor-readable instructions that cause the processor to: select a content category using the characteristic of the image; and select the content from the content category using the physiological state data of the user.

In an example of a system, a system for delivering content to a user of a mobile device is presented. The system may include a processor. The system may include a memory communicatively coupled with and readable by the processor and having stored therein processor-readable instructions. The instructions, when executed by the processor, cause the processor to cause physiological state data collected from the user of the mobile device captured at a time to be received from the mobile device. The instructions may cause the processor to cause image data based on an image captured by the mobile device to be received from the mobile device, wherein the image was captured at least approximately at the time. The instructions may cause the processor to analyze the image data to identify a characteristic of the image. The instructions may cause the processor to analyze the physiological state data collected from the user of the mobile device. The instructions may cause the processor to select content to deliver to the mobile device of the user at least partially based on the physiological state data collected from the user and the characteristic of the image, wherein the content is selected from a plurality of content. The instructions may cause the processor to cause the content to be transmitted to the mobile device.

Embodiments of such a system may include one or more of the following: The processor-readable instructions may further comprise additional processor-readable instructions configured to cause the processor to determine a price for presenting the content related to the physiological state data collected from the user and the characteristic of the image to the user, wherein the price is to be charged to a content provider associated with the content. The content may be linked with an ideal physiological state. The price for presenting the content may be higher the more likely the physiological state data collected from the user indicates the ideal physiological state. The content may comprise one or more advertisements. The processor-readable instructions may further comprise additional processor-readable instructions configured to cause the processor to cause a location of the user to be received from the mobile device, wherein the location was determined at least approximately at the time, wherein: the processor-readable instructions that cause the processor to select content to deliver to the mobile device additionally use the location of the user. The content selected for the mobile device may be further based on one or more stored characteristics of the user. The processor-readable instructions configured to cause the processor to select content to deliver to the mobile device of the user may further comprise additional processor-readable instructions that cause the processor to: select a content category using the characteristic of the image; and select the content from the content category using the physiological state data collected from the user.

In an example of an apparatus, an apparatus for delivering content to a user of a mobile device is presented. The apparatus may include means for receiving, from the mobile device, physiological state data collected from the user of the mobile device captured at a time. The apparatus may include means for receiving image data based on an image captured by the mobile device, wherein the image was captured at least approximately at the time. The apparatus may include means for analyzing the image data to identify a characteristic of the image. The apparatus may include means for analyzing the physiological state data collected from the user of the mobile device. The apparatus may include means for selecting content to deliver to the mobile device of the user at least partially based on the physiological state data collected from the user and the characteristic of the image, wherein the content is selected from a plurality of content. The apparatus may include means for transmitting the content to the mobile device.

Embodiments of such an apparatus may include one or more of the following: The apparatus may include means for determining a price for presenting the content related to the physiological state data of the user and the characteristic of the image to the user, wherein the price is to be charged to a content provider associated with the content. The content may be linked with an ideal physiological state. The price for presenting the content may be higher the more likely the physiological state data collected from the user indicates the ideal physiological state. The content may comprise one or more advertisements. The apparatus may include means for receiving, from the mobile device, a location of the user, wherein the location was determined at least approximately at the time of a measurement of the physiological state data collected from the user, wherein: the means for selecting content to deliver to the mobile device additionally uses the location of the user. The content selected for the mobile device may be further based on one or more characteristics of the user. The means for selecting content to deliver to the mobile device of the user may comprise: means for selecting a content category using the characteristic of the image; and means for selecting the content from the content category using the physiological state data collected from the user.

In an example of a system, a system for delivering content to a user of a mobile device is presented. The system may include a host computer system. The system may include a processor. The system may include a memory communicatively coupled with and readable by the processor and having stored therein processor-readable instructions. The instructions when executed by the processor, may cause the processor to cause physiological state data collected from the user of the mobile device captured at a time to be received from the mobile device. The instructions when executed by the processor, may cause the processor to cause image data based on an image captured by the mobile device to be received from the mobile device, wherein the image was captured at least approximately at the time. The instructions when executed by the processor, may cause the processor to analyze the image data to identify a characteristic of the image. The instructions when executed by the processor, may cause the processor to analyze the physiological state data collected from the user of the mobile device. The instructions when executed by the processor, may cause the processor to select content to deliver to the mobile device of the user at least partially based on the physiological state data collected from the user and the characteristic of the image, wherein the content is selected from a plurality of content. The instructions when executed by the processor, may cause the processor to cause the content to be transmitted to the mobile device. The system may include the mobile device. The mobile device may capture the image at the time. The mobile device may store image data based on the image. The mobile device may capture the physiological state data collected from the user of the mobile device, wherein the physiological state corresponds at least approximately to the time. The mobile device may transmit the physiological state data collected from the user and the image data to the host computer system. The mobile device may receive, from the host computer system, the content selected using the physiological state data collected from the user and the image data. The mobile device may present the content selected using the physiological state data collected from the user and the image data to the user.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 3B illustrates an embodiment of sample entries from a user database.

FIG. 3C illustrates an embodiment of sample entries from a pricing database.

DETAILED DESCRIPTION

Figure 1:
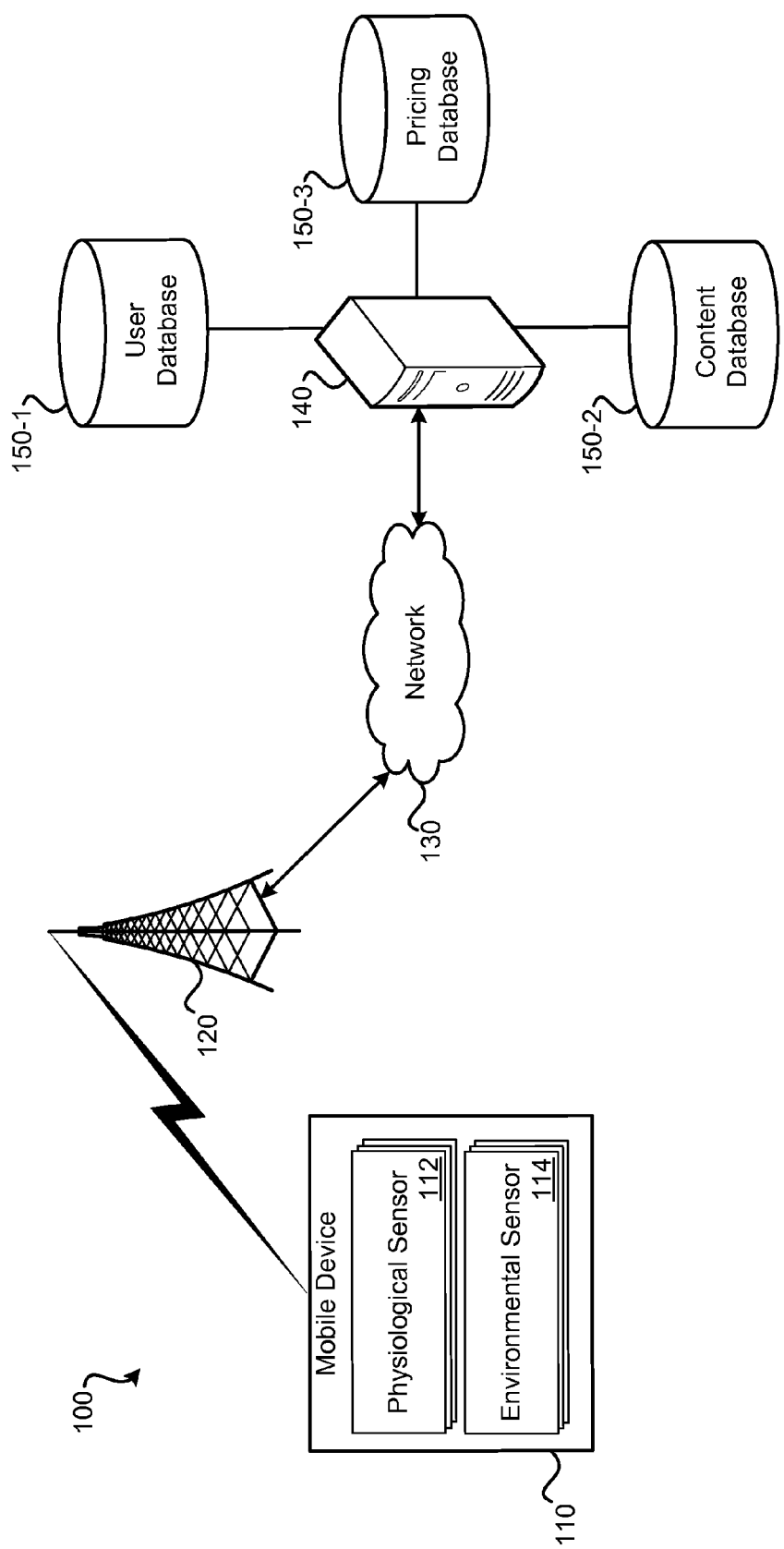
FIG. 1 illustrates an embodiment of a system configured for relevant content delivery.

The more relevant content is to a user, the more likely the user may be to interact with the content. If the content is an advertisement, an advertisement relevant to a user may be more likely to lead to a purchase by the user of the advertised goods or services. Further, by targeting potential consumers more accurately, an entity delivering the content to the users may be able to charge content providers more money because users receiving the content are more likely to be interested in the content.

Active input, that is, input supplied by the user through a user input device, such as using a keypad or touch screen, can be used to identify content relevant to the user. However, besides active input, additional types of data can be collected from the user and the user's environment to identify content relevant to the user. In addition to active input, a mobile device, such as a cellular phone, can collect environmental data and physiological state data of the user to assist in providing relevant content, such as advertisements, recommendations, and applications to a user of the mobile device. These forms of data, when used together and/or in conjunction with other data gathered about the user, may allow for content to be targeted more precisely to the user.

Environmental data and physiological state data may be collected by a mobile device and transmitted to a host computer system. The host computer system may analyze the environmental data and the physiological state data. Based on this analysis and, possibly other characteristics of the user, content to be delivered to the mobile device may be determined. The content may be delivered and presented (e.g., displayed visually and/or played aloud) to the user via the mobile device.

Environmental data may include: the location of the mobile device, motion of the mobile device (e.g., speed and patterns), the temperature of the mobile device, objects in the vicinity of the mobile device, etc. A camera on the mobile device may be used to capture images, which may be used as environmental data. These images may be captured periodically by the mobile device without input from the user. For example, a camera may be mounted to an earpiece (or other portion) of a mobile device that faces in the direction of the user's field of vision. Images may also be captured based on user input. For example, a user may aim the camera of his mobile device at an object and provide input to the mobile device (e.g., press a button on the keypad or touch-screen) to indicate that an image is to be captured. Image data from these images, whether captured due to user input or automatically, may be analyzed (either locally by the mobile device or remotely by a host computer system) in conjunction with physiological state data captured by the mobile device and used to provide the end user with relevant content, such as one or more advertisements.

In some embodiments, environmental data may be used to determine a type of content to deliver to a user, for example, the content may be an advertisement for a specific drink company. Physiological state data gathered about the user, collected approximately contemporaneously with the collection of the environmental data, may be used to present a specific advertisement for that drink company. For example, if an image is captured that has a logo of the drink company in the background, an advertisement for a drink produced by the company may be provided to the user. Which specific drink is advertised may be based on the physiological state of the user. For example, if the user has an elevated heart rate, elevated blood pressure, and is hot, this may indicate physical activity. As such, a sports drink advertisement may be presented to the user. However, if the user's physiological state indicates that the user is tired, an energy drink advertisement may be presented to the user. If the user's physiological state is approximately normal, a soft drink may be recommended.

In addition to input from a camera, other environmental data, such as the motion of the mobile device, may be captured by a motion sensor, such as an accelerometer or gyroscope. Such motion may reveal an activity of the user. For example, a mobile device with a bouncing up and down motion pattern for a period of time may indicate that the user is running. Such environmental data may be used to help arrive at the conclusion that the user is in need of a sports drink. Location data may also be used. A GPS receiver, or some other form of location sensor, may be used to determine the location of a mobile device, and thus, the user who is likely carrying the mobile device. Such location data may be used to target particular regions, both large and small. For example, when a user is walking within a mall, a drink company may desire to advertise smoothies available in the mall's food court when the user appears to be thirsty. Another content provider may only want advertisements provided to a user when the user is within a certain distance of a location selling the content provider's goods or services. For example, a good that a user is unlikely to travel a great distance to procure, such as a cup of coffee, may only be advertised when the user is tired and within a quarter mile of a coffee shop being advertised. Other goods, which a user may be more likely to travel a significant distance to acquire, may be advertised at a greater distance. For example, if a user is determined to be in an electronics department of a big box store, an advertisement for a competitor located 10 miles away may present the user with an advertisement that is hoped to be persuasive enough to convince the user to travel to the distance to the competitor (such as a coupon for 15% off electronics).

Physiological state data, that is, data about the user's physical condition, may be used to provide relevant content to the user. One or more physiological sensors, such as electrocardiogram (ECG) sensors, galvanic skin response (GSR) sensors, plethysmography (PPG) sensors, skin temperature sensors (SKT), and/or electromyogram (EMG) sensors can be incorporated into the mobile device and used to collect physiological state data from the user. This information may be used to infer the end user's emotional and/or physical state, collectively referred to as the user's "physiological state." Such physiological state data may be used alone or in combination with environmental data, user stored data, and/or active user input to provide the user with relevant content at a mobile device.

Stored user data, such as data stored in a user database at a host computer system, about the user may be used to provide relevant content to the user. For example, biographical information about the user may be stored that indicates the user's: sex, age, address, ethnicity, income level, job, religious affiliation, and/or travel patterns (to name only a few examples). Travel patterns may be established over a period of time using location data and may be used to infer when the user is commuting, working out, traveling for work, and/or traveling for pleasure.

As examples only, the following arrangements use environmental data in conjunction with physiological state data to allow for relevant content delivery to a user. In a first example, a purchase transaction is conducted at a first merchant's location. When a user is viewing an item for purchase from a first merchant, the user may capture an image of the item using the user's mobile device (be it automatically because the mobile device periodically captures images in the direction the user is facing or by the user pointing a camera of the mobile device at the item). Approximately at the time when the image is captured, physiological state data of the user may be collected. Such physiological state data may provide an indication of whether the user is interested in purchasing the item. For example, an increased heart rate may equate to a desire for the item. If it appears the user is likely to make a purchase from the first merchant, an advertisement for the same item (or an equivalent item) may be sent to the mobile device of the user, possibly on behalf of a second merchant, that may be attempting to lure the user to leave the first merchant and make the purchase from the second merchant. If the user does not seem excited about the item, an even deeper discount may be offered by the first or second merchant in an attempt to convince the user to purchase the item.

As a second example, consider stress experienced by a user at the user's job. Throughout a typical day and week, stress levels of the user may go up and down. When the user's stress level is particularly high, the user may be more likely to take a break and benefit from a good or service that is relaxing or at least serves as a temporary distraction. When physiological state data of the user indicates a high amount of stress, a service, such as a massage, and/or a relaxing product, such as an iced mocha latte, may be offered to the user via content presented on the mobile device. Because a user is unlikely to take a very long break from work, and thus, is unlikely to travel far, goods or services may only be offered to the user in the vicinity of the user's location. Similarly, if during normal work hours physiological state data indicates the user is likely tired, an advertisement for a caffeinated and/or sugared product may be offered to the user. Environmental data may affect the content presented to the user. For example, if images collected from the mobile device indicate that the user is traveling past a particular coffee chain, advertisements from that coffee chain may be more likely to be presented. If environmental data indicates the user is driving, a discount may be offered to cover the user's cost to park, while if the environmental data indicates the user is walking, a different discount or offer by the coffee chain may be presented.

As a third example, a user is running with a mobile device. Environmental sensors, based on speed, motion of the mobile device (e.g., bouncing up and down) and/or location, may indicate that the user is likely running. During the run, or following the run, the user's physiological state may be determined to be tired and/or dehydrated based on physiological state data. In response, a product directed to help the user may be advertised, such as an advertisement for water, a sports drink, and/or an energy bar. In some embodiments, after a workout has been sensed, a "treat" as a reward to the user may be offered, such as an advertisement for an ice cream sundae. As a similar example, if a user captures an image of a sporting venue (e.g., a stadium, park, or river), and the physiological state data indicates the user is interested in the sporting venue (e.g., to attend a sporting event, picnic, or perform an outdoor activity such as kayaking), advertisements for appropriate goods and/or services may be provided to the user via the mobile device. For example, advertisements for items such as sunscreen, event tickets, flying discs, blankets, kayak rentals, and helmets may be provided. More specifically, advertisements for goods and/or services available in the immediate vicinity of the sporting venue may be delivered to the user.

As a fourth example, the health of a user is monitored. If the user's physiological state data indicates the user is unwell (e.g., high blood sugar, high blood pressure), a message may be provided to the user recommending a course of action, product, or service. Based on environmental sensors, which may be used to determine what activity a person is participating in, various ranges of physiological states may be permitted before a service or product is recommended to the user based on the user's health. For example, if environmental data suggests the user is exercising, the user's heart rate and blood pressure may be higher than if the user is still (e.g., sitting at a desk at work), and thus, the user may not be in need of treatment for high blood pressure. If the user's heart rate is high while environmental data indicates the user is inactive, content regarding high blood pressure treatment and/or medication may be presented to the user via the mobile device (possibly along with a recommendation to see a doctor). Extreme physiological state data could result in an ambulance being notified with location data from an environmental sensor being used to locate the user.

The above four examples represent various possible applications of systems and methods for relevant content delivery and are to serve as non-limiting examples only. Many other possible applications of relevant content delivery using environmental and physiological state data are possible.

FIG. 1 illustrates an embodiment of a system 100 configured for relevant content delivery. System 100 may include: mobile device 110, wireless network 120, network 130, host computer system 140, and databases 150 (which may include user database 150-1, content database 150-2 and pricing database 150-3).

Mobile device 110 may include one or more physiological sensors, such as physiological sensor 112. Physiological sensor 112 may be one of the previously discussed physiological sensors or may be some other form of physiological sensor. Mobile device 110 may include one or more environmental sensors. Environmental sensor 114 may be: a camera (still and/or video), an accelerometer, a magnetometer, or a location sensor (e.g., GPS sensor), to name only a few examples. Mobile device 110 may also include other components, such as a processor, non-transitory computer-readable storage device, and a transceiver. Mobile device 110 may be a cellular phone. Mobile device 110 may also be some other form of mobile device such as a tablet computer, laptop computer, PDA, or electronic book reader. Further, while the description provided herein is directed to providing relevant content to a mobile device, it should be understood that such relevant content may also be provided to a device that is not mobile, such as a desktop computer that is communicatively coupled with one or more physiological sensors and one or more environmental sensors.

Mobile device 110 may communicate with wireless network 120. Wireless network 120, which may be a cellular network, may permit mobile device 110 to communicate with host computer system 140, possibly via network 130. Mobile device 110 may be configured to communicate via multiple types of wireless networks. For example, when within range of an available WiFi network, the WiFi network may be used to communicate with host computer system 140. When outside of WiFi coverage, a cellular network may be used for communication. If no wireless network is available, physiological state data and/or environmental data may or may not be stored by mobile device 110 for later transmission to host computer system 140 when a wireless network connection becomes available. Network 130 may represent one or more public networks (e.g., the Internet) and/or one or more private networks (e.g., a corporate local area network). In some embodiments, mobile device 110 may communicate directly with network 130.

Host computer system 140 may represent one or more computer systems. Host computer system 140 may communicate with mobile device 110 via network 130 and/or wireless network 120. Host computer system 140 may receive and analyze environmental and physiological state data received from mobile device 110. Based, at least partially, on the environmental and physiological state data received from mobile device 110, host computer system 140 may transmit content to mobile device 110. Host computer system 140 may access one or more databases 150.

Databases 150 may include user database 150-1, content database 150-2, and/or pricing database 150-3. It should be understood that databases 150 may be combined into fewer databases or may be divided into a greater number of databases. The illustrated embodiment of system 100 shows databases 150 as local to host computer system 140; however, in some embodiments databases 150 may be accessible remotely via one or more networks, such as network 130, by host computer system 140.

User database 150-1 may store characteristics of various users of mobile devices. Such characteristics may be used in selecting content to be transmitted to mobile device 110. User database 150-1 may store information about the user of mobile device 110 (and the users of other mobile devices). For example, information regarding the user's age, sex, travel patterns, religion, ethnicity, purchase habits, income, location, job, and/or hobbies may be types of information stored about the user. Such information may have been explicitly provided by the user, may have been purchased from an advertising agency, and/or may have been determined based on previous data received from the user's mobile device. Such information may be used by host computer system 140 when identifying content to be transmitted to mobile device 110.

Content database 150-2 may contain the content that host computer system 140 has available to deliver to mobile devices, such as mobile device 110. Content in content database 150-2 may be textual, graphic, and/or auditory. Content database 150-2 may also contain indications of the conditions under which each piece of content should be delivered to a user. For example, an ideal physiological state of the user, various acceptable locations, environmental data, the name of the content provider, or a category of content are examples of data that may be stored in content database 150-2.

Pricing database 150-3 may be used to store how many times each piece of content has been delivered to mobile devices and how many times the content has been interacted with by users of the mobile devices. The pricing database may also contain an indication of how much the content provider (the entity that provided the content to be delivered to users) should be charged for each instance of the content either sent to a mobile device or interacted with by a user. In some embodiments, the content provider may be charged more for content that closely matches the user's physiological state data and/or environmental data. For example, if a user's physiological state data indicates that he is very thirsty, the content provider may be charged more for content to be delivered to that user than the same content to a user who is marginally thirsty.

While system 100 illustrates a single mobile device, it should be understood that many mobile devices, associated with many different users, may be in communication with host computer system 140. As such, different content may be delivered by host computer system 140 to different mobile devices associated with different users. System 100 may be used to perform various methods of delivering relevant content to users. For example, system 100 may be used to perform methods 400-700 of FIGS. 4-7, respectively.

Figure 2:
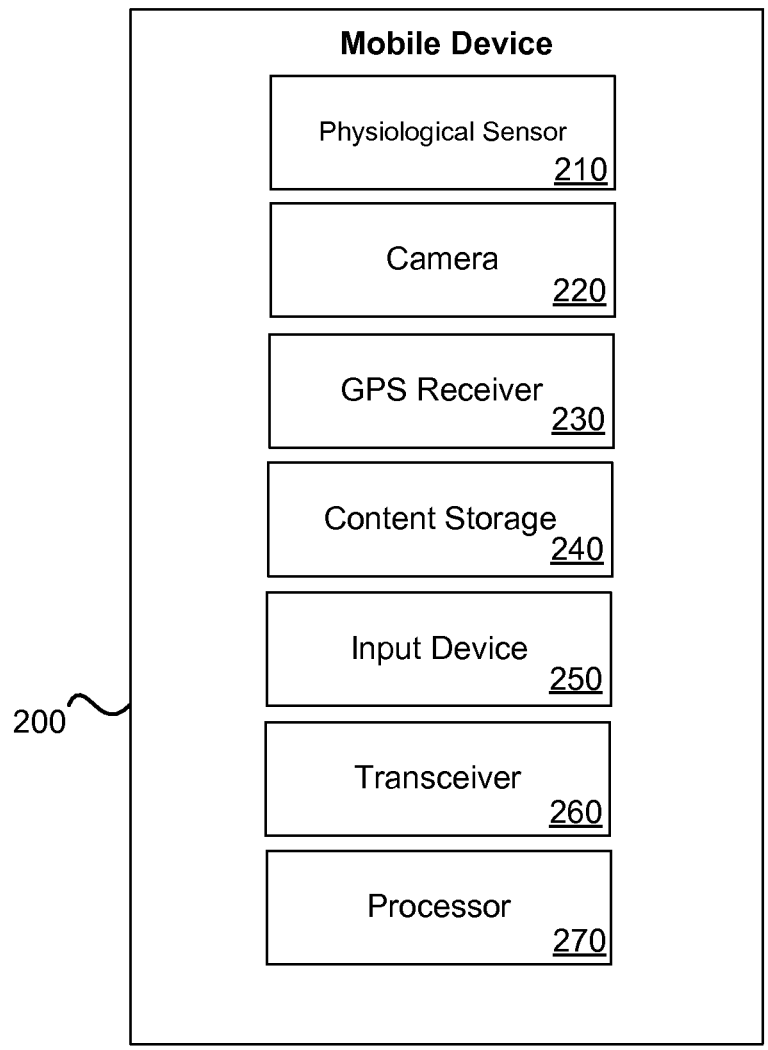
FIG. 2 illustrates an embodiment of a mobile device that collects physiological state data and environmental data related to a user.

FIG. 2 illustrates an embodiment of a mobile device 200 that collects physiological state data related to a user and environmental data. Mobile device 200 may represent mobile device 110 of FIG. 1 and/or other mobile devices that may be used as part of system 100. Mobile device 200 may include physiological sensor 210, camera 220, GPS receiver 230, content storage 240, input device 250, transceiver 260, and processor 270. Mobile device 200 may also contain other components that are not presented here for simplicity.

Physiological sensor 210 may gather physiological state data about the user. Physiological sensor 210 may periodically attempt to gather physiological state data about the user. In some embodiments, physiological sensor 210 only attempts to gather physiological state data when the user is interacting with mobile device 200 (such as via input device 250). Physiological sensor 210 may be a sensor, such as an electrocardiogram (ECG) sensor, a galvanic skin response (GSR) sensor, a plethysmography (PPG) sensor, a skin temperature sensor (SKT), or a electromyogram (EMG) sensor. More than one physiological sensor may be present in mobile device 200. Physiological state data gathered by physiological sensor 210 may be collected over a period of time and averaged or otherwise analyzed locally. As such, each measurement of physiological state data collected by the physiological sensor 210 may not be transmitted to a host computer system. Along with physiological state data, a time that corresponds to the date and/or time of the data may be recorded. As such, it is known at what time the physiological state data was measured for the user.

Camera 220 may represent a video and/or still camera that is part of, or in communication with, mobile device 200. Camera 220 may periodically capture images in a direction that the user is looking. For example, such periodic capturing of images may occur if the camera is mounted to a headpiece the user is wearing (such as a microphone/speaker headset). In some embodiments, camera 220 may capture devices when indicated by the user. For example, via input device 250, the user may provide input indicating the camera is to capture an image. Some or all of the captured raw images may be transmitted for analysis to the host computer system. In some embodiments, some amount of processing may occur at mobile device 200. For example, image data may be derived from an image captured by camera 220. This may reduce the amount of data necessary to be transmitted to the host computer system. In some embodiments, images are analyzed by the mobile device to identify characteristics of the image. Characteristics of images may include identifiers linked with one or more identified objects present in the image. For example, a characteristic may be a logo of a company, a product, or a location being identified within an image. Images may be captured at approximately the same time as physiological state data.

GPS receiver 230 may periodically determine the location of mobile device 200 using received GPS signals. Other forms of location determination may also be possible. This location data may be transmitted to the host computer system periodically. The location data from GPS receiver 230 may be used to determine travel patterns of the user, such as where the user lives, where the user works, and the user's commute. Location data may be gathered by GPS receiver 230 approximately at the time that images are captured by camera 220 and/or physiological state data is captured by physiological sensor 210.

Content storage 240 may represent a separate or a portion of a non-transitory computer-readable storage medium. Content that is or potentially may be displayed to the user may be stored in content storage 240. Content storage 240 may receive content from the host computer system. The content may be stored in content storage 240 until it is presented to the user a predefined number of times (e.g., once, twice, five times). In some embodiments, content storage 240 stores multiple pieces of content. A specific piece of content from content storage 240 may be presented when a message-triggering presentation is received from the host computer system. As such, when the content is to be presented to the user, the content may already be stored locally by the mobile device, thus possibly allowing the content to be displayed sooner. Content storage 240 may store an indication of how often pieces of content have been presented to the user and/or how often the user has interacted with the content (e.g., followed a link within the content, displayed the content's coupon, etc.).

One or more input devices may be present on mobile device 200. Input device 250 may be a touch screen, keypad, or some other component of mobile device 200 that a user may use to provide input to mobile device 200. Transceiver 260 may communicate with one or more wireless networks. Processor 270 may be used for processing. For example, processor 270 may be used to analyze and process images captured by camera 220 to identify image data, including characteristics of the images.

Figure 3A:
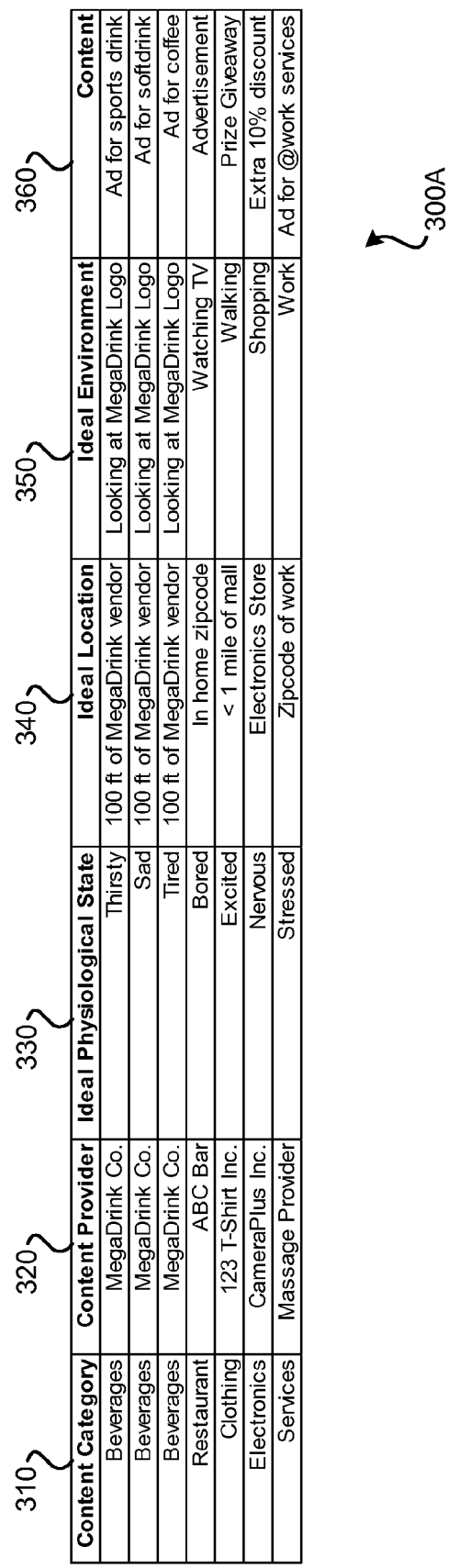
FIG. 3A illustrates an embodiment of sample entries from a content database.

FIG. 3A illustrates an embodiment of sample entries 300A from a content database. Sample entries 300A may represent entries from content database 150-2 of FIG. 1. Sample entries 300A may also represent entries from some other database that is used to store content to be pushed to mobile device users. Each entry of content database may comprise: a content category 310, a content provider 320, an ideal physiological state 330, an ideal location 340, an ideal environment 350, and content 360.

Content category 310 data entries may indicate a general category in which a piece of content is classified. All content within a particular category may belong to a particular content provider. For example, all beverages advertised may be beverages produced by a particular company. In some embodiments, content from multiple content providers may also be present within a particular category. Content provider 320 data entries may be the entities that have paid or will be paying for the content to be provided to the user. A single content provider may be associated with multiple pieces of content in a content database.

Pieces of content may be delivered to a mobile device based on location, physiological state data, and environmental data received from a mobile device as compared to an ideal location, ideal physiological state data, and ideal environmental data associated with the content. Ideal physiological state 330 data entries may refer to the physiological state that the content provider desires the user to be in when receiving the content. Ideal location 340 data entries may be restrictions on the locations where the content provider wants the content to be presented to the user. If outside the ideal location specified by the content provider, the content may not be considered for presentation to the user. Ideal environment 350, which may be the same as ideal location 340, may specify additional characteristics of the environment of the user for when the content is to be presented to the user. For example, referring to the first entry, in addition to ideal location 340 being near a MegaDrink vendor, image data captured by the mobile device may be required to indicate the user is looking at a MegaDrink logo (or, at least, that the logo is likely in the user's field of view), such as on a storefront. Content 360 data entries may indicate the content that is to be presented to the user for a specific entry. The content may be text, as indicated by content 360 data entries. In some entries, the content may be graphical and/or auditory. In some embodiments, the content may be visual, for example a projection on a display device of the mobile device configured to provide augmented reality. For example, referring again to the logo of MegaDrink, the logo may be modified to reflect an advertisement for a specific MegaDrink product.

As should be understood, a content database may contain more or fewer types of data. The specific conditions under which content for a content provider is pushed to a user may be highly customizable. For example, as long as one or two conditions are satisfied (e.g., ideal physiological state, ideal location, or ideal environment), the content may be eligible to be pushed to a user. The more conditions satisfied, the more the content provider may pay for the content to be pushed to the user. A content provider may be permitted to select which conditions are required (e.g., an ideal location that the user must be at), or are optional (an ideal environmental characteristic, if present, the content provider pays extra for the content to be delivered to the user, e.g., a content provider's logo appearing in an image captured by the mobile device).

FIG. 3B illustrates an embodiment of sample entries 300B of a user database. Sample entries 300B may represent entries from user database 150-1 of FIG. 1. Sample entries 300B may also represent entries from some other database that is used to store data about mobile device users. Each entry of a user database may comprise data entries for: a user device identifier 370, a user 375, a home zip code 380, a work zip code 385, an age group 390, whether the user is a commuter 395, and the user's typical physiological state 397.

A user device identifier 370 data entry may be an identifier specific to a mobile device, such as a telephone number. User 375 data entries may be the user's name. The home zip code 380 data entries and work zip code 385 data entries may be related to the location of the user's residence and job, respectively. This data may be explicitly provided by the user or may be determined based on the user's travel patterns (e.g., where the user is typically located Monday through Friday, 9 AM to 5 PM, and where the user is typically located in the evenings). Age group 390 data entries may specify an age range which the user is within. This data may be provided by the user, determined based on the user's physiological state data, the user's input to the mobile device, and/or data acquired from a consumer research firm. Based on the user's travel patterns, whether the user is a commuter may be determined and stored in commuter 395 data entries. Based on previous physiological state data received from a mobile device of a user, the user's typical physiological state 397 may be identified. Such data may be accessible by a host computer system and may be used to further target content to users. As should be understood, a user database may contain more or fewer types of data. The specific use data gathered and stored may be highly customizable.

FIG. 3C illustrates an embodiment of sample entries 300C of a pricing database. Samples entries 300C may represent entries from pricing database 150-3 of FIG. 1. Sample entries 300C may also represent entries from some other database that is used to store pricing data for the delivery of content to mobile devices. Each entry of a pricing database may contain data entries for: a content identifier 312, a content provider 314, a minimum cost 316, a maximum cost 318, a number of deliveries 322, and a number of confirmed presentations 324.

The content identifier 312 data entries and content provider 314 data entries may be used to identify the content provider responsible for paying the cost of delivering the content associated with each entry in the pricing database. Each entry in the pricing database may have a corresponding entry in the content database. The corresponding entries in the pricing database and the content database may be linked by a content identifier that is specific to a particular piece of content.

Minimum cost 316 data entries and maximum cost 318 data entries may define the range of costs a content provider is to pay for a piece of content to be delivered to a user depending on how closely related the user's physiological state data, environmental data, and/or location data is to an ideal physiological state, ideal environmental data, and/or ideal location specified by the content provider. The closer the data matches, the higher the cost. More detail on pricing is provided in reference to method 700 of FIG. 7.

Deliveries 322 data entries and confirmed presentations 324 data entries may be used to periodically bill the content provider. The number of deliveries 322 may indicate the number of times the content has been transmitted to mobile devices. The number of confirmed presentations 324 may indicate the number of times the host computer system has received a confirmation from mobile devices or indicate a user has been presented the content. As should be understood, a pricing database may contain more or fewer types of data. The specific data used for pricing may be highly customizable.

Figure 4:
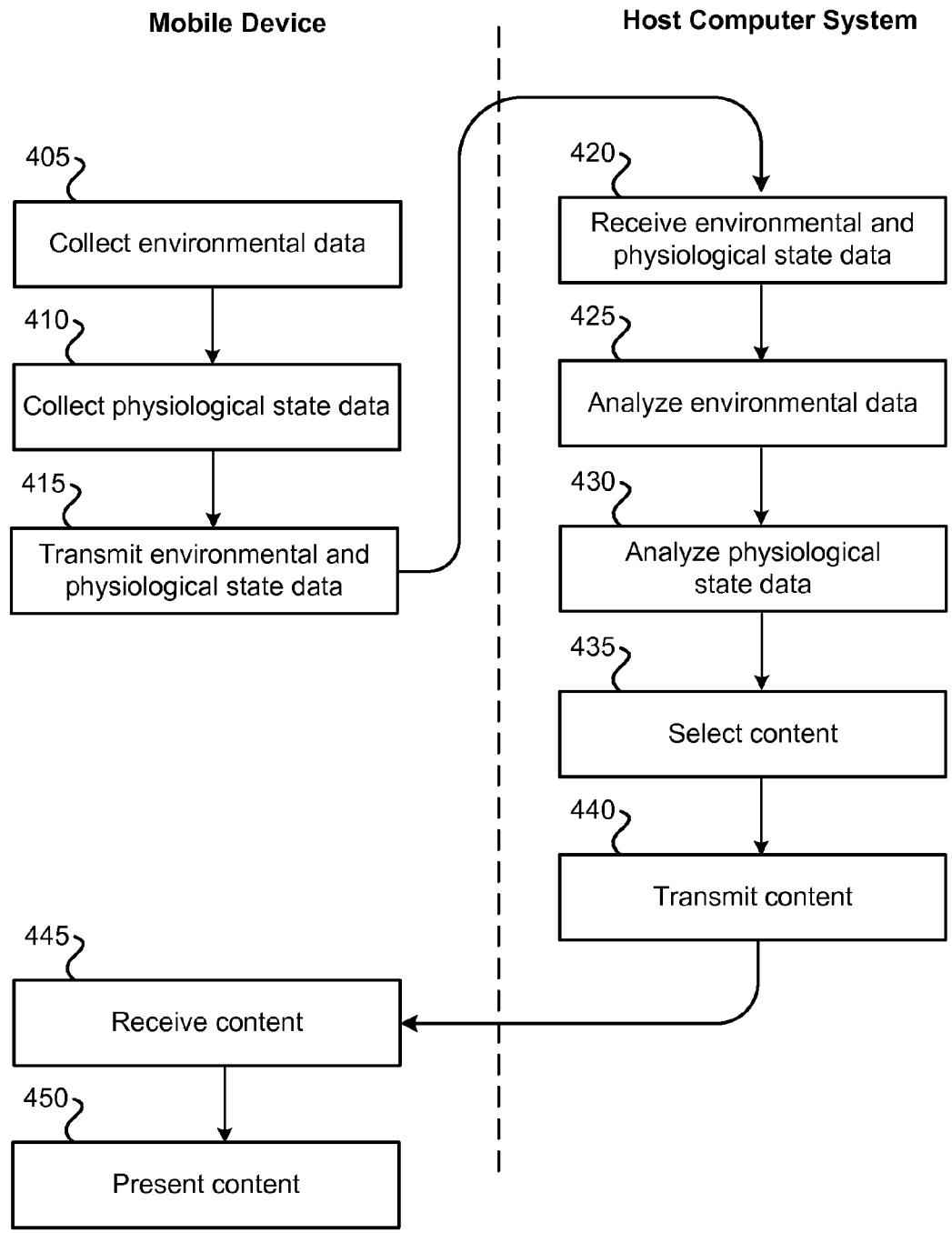
FIG. 4 illustrates an embodiment of a method for delivering relevant content to a mobile device.

FIG. 4 illustrates an embodiment of a method for delivering relevant content to a mobile device. Method 400 may be performed by system 100 of FIG. 1 or by some other system for providing relevant content to a mobile device. At step 405, environmental data may be collected by one or more environmental sensors of a mobile device, such as mobile device 110 of FIG. 1. Environmental data may be collected via a positioning sensor (e.g., GPS), a motion sensor (e.g., accelerometer), a direction sensor (e.g., magnetometer), and/or a camera (which may be continuously capturing images or may only capture images when indicated by the user). Other types of environmental sensors may also be possible. Environmental data may be collected periodically without user interaction or when determined by the user.

At step 410, physiological state data may be collected by one or more physiological sensors of the mobile device. Physiological state data may be gathered by electrocardiogram (ECG) sensors, galvanic skin response (GSR) sensors, plethysmography (PPG) sensors, skin temperature sensors (SKT), and/or electromyogram (EMG) sensors, to name only a handful of examples. The physiological state data may be collected at the same time, or approximately the same time, as the environmental data collected at step 405. For example, capturing the environmental data and the physiological state data at approximately the same time may refer to capture of both within a window of 1 second, 5 seconds, 10 seconds, or 1 minute. Other time frames between step 405 and step 410 may also be used.

At step 415, the environmental and physiological state data may be transmitted to a host computer system. Transmission may occur via one or more networks. Referring to FIG. 1, transmission of environmental data and physiological state data from mobile device 110 to host computer system 140 may occur via wireless network 120 and network 130, which may include the Internet.

At step 420, the environmental and physiological state data may be received by the host computer system. At step 425, the environmental data may be analyzed by the host computer system. Analysis may include steps such as: identifying one or more objects appearing within an image, interpreting accelerometer data, determining a physiological state of the user, determining an activity of the user, and/or determining businesses or other entities in the vicinity of the user. At step 430, the physiological state data may be analyzed. Analysis may include steps such as: using the physiological state data to identify a likely physiological state of the user. A physiological state identified for the user may also be associated with an intensity level. For example, if the physiological state data of the user indicates a physiological state of nervous, the user's nervous state could be associated with an intensity level of low, medium, or high based on the physiological state data. Physiological state data may be collected over a period of time and averaged (or otherwise combined) to identify the user's physiological state.

While method 400 illustrates analysis being performed by the host computer system, it should be understood that rather than transmitting raw environmental and physiological state data to the host computer system, the environmental and/or physiological state data may be partially or wholly analyzed by the mobile device, with results of the analysis transmitted to the host computer system. For example, rather than transmitting an image as environmental data to the host computer system, the image may be analyzed for various characteristics and only indications of the characteristics of the image (e.g., identifiers of objects present in the image, a location of the user) may be transmitted to the host computer system. Image data may contain a whole image captured by the camera, a partial image captured by the camera, and/or characteristics of an image as analyzed by the mobile device.

The analysis of the environmental and physiological state data may be used at step 435 to determine what content to present to the user of the mobile device. A content database (such as content database 150-2 of FIG. 1), which may contain advertisements, and may be searched to identify content that most closely relates to the analyzed environmental and physiological state data. If no relevant content is identified, no content may be presented to the user. If relevant content is identified (e.g., containing the ideal location, ideal environmental data, and/or ideal physiological state associated with the content in the content database is similar to the analyzed data) at step 440, the content may be transmitted to the mobile device.

At step 445, the content may be received by the mobile device. At step 450, the content may be presented to the user. In some embodiments, this may involve displaying text and/or graphics to the user and/or audio played via a speaker of the mobile device. In some embodiments, the content may be stored by the mobile device until an appropriate time to present the content. For example, the content may be stored until presented to the user while it is known the user is viewing the display, such as when the user is actively providing input to the mobile device. In some embodiments, the content may be presented to the user via an augmented reality display. For example, the content may be overlaid with an image captured by the mobile device's camera.

While data is transmitted to the host computer system to identify content to be presented to the user, it should be understood that various pieces of content may be stored by the mobile device. As such, the mobile device could collect environmental and physiological state data, analyze the environmental and physiological state data, determine content, and present such content to the end user without interaction with the host computer system to retrieve content. Rather, the host computer system may periodically provide various pieces of content to the mobile device, which may store the content and present the content to the user when corresponding environmental and physiological state data is collected.

Figure 5:
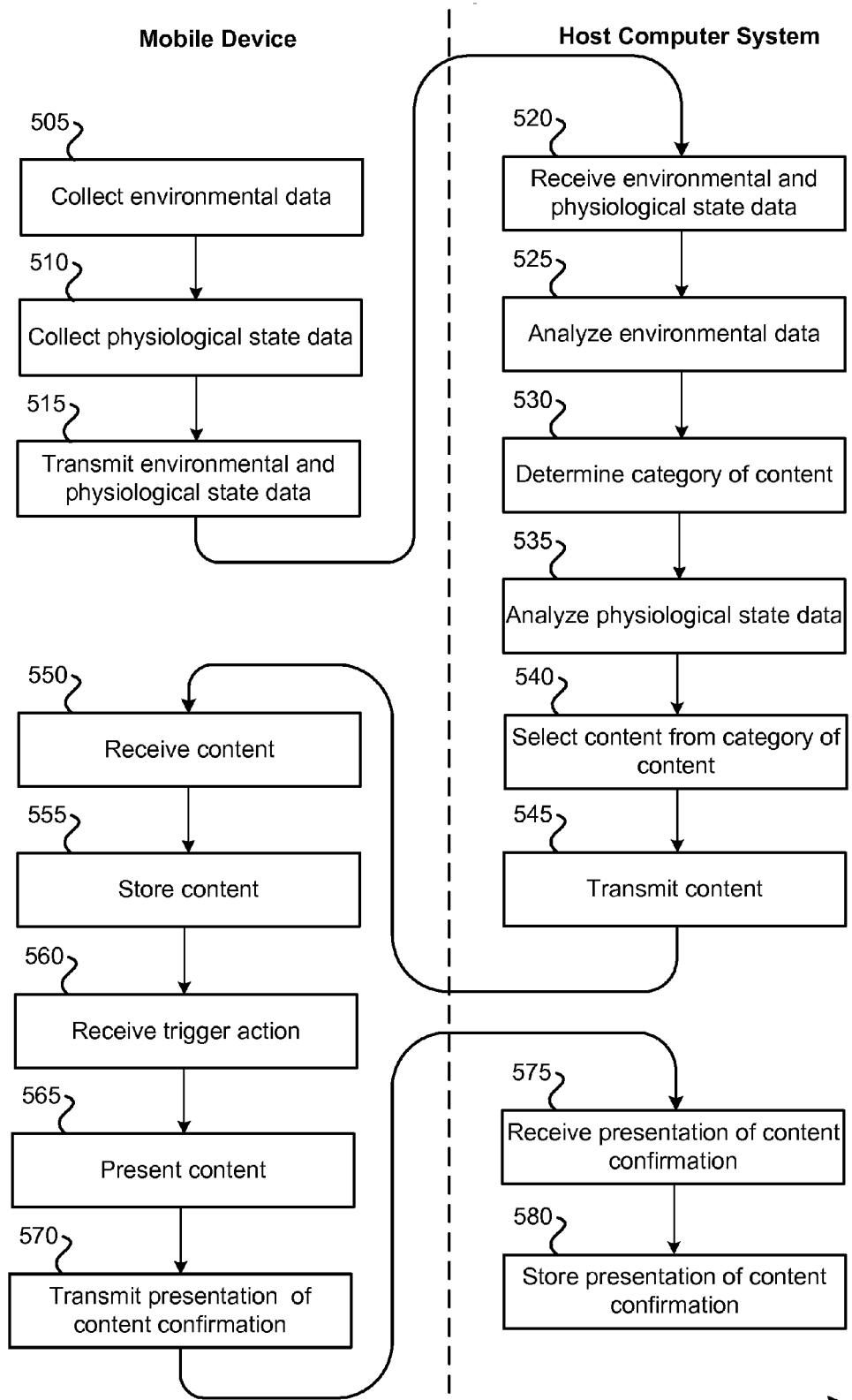
FIG. 5 illustrates an embodiment of a method for delivering relevant content selected from a category of content to a mobile device wherein the content is presented to a user of the mobile device based on a trigger action.

FIG. 5 illustrates an embodiment of a method for delivering relevant content selected from a category of content to a mobile device presented to a user of the mobile device based on a trigger action. In method 500, environmental data from a mobile device is used to select a category of content, while the physiological state data from the mobile device is used to select a piece of content from the selected category of content. In some embodiments, method 500 can apply to the reverse situation: the physiological state data is used to select a category of content, while the environmental data is used to select a piece of content from the selected category of content. Method 500 may be performed by system 100 of FIG. 1 or by some other system for providing relevant content to a user via a mobile device.

Similarly to step 405 of method 400, at step 505, environmental data may be collected by one or more environmental sensors of a mobile device, such as mobile device 110 of FIG. 1. Environmental data may be collected via a positioning sensor (e.g., GPS), a motion sensor (e.g., accelerometer), a direction sensor (e.g., magnetometer), or a camera (which may be continuously capturing images or may only capture images when indicated by the user). Other types of environmental sensors may also be possible. Environmental data may be collected periodically or when determined by the user.

At step 510, physiological state data may be collected by one or more physiological sensors of the mobile device. Physiological state data may be gathered by electrocardiogram (ECG) sensors, galvanic skin response (GSR) sensors, plethysmography (PPG) sensors, skin temperature sensors (SKT), and/or electromyogram (EMG) sensors, to name only a handful of examples. The physiological state data may be collected at the same, or approximately the same, time as the environmental data collected at step 505. For example, capturing the environmental data and the physiological state data at approximately the same time may refer to capture of both within a window of 1 second, 5 seconds, 10 seconds, or 1 minute. Other time frames between step 505 and step 510 may also be used.

At step 515, the environmental and physiological state data may be transmitted to a host computer system. Transmission may occur via one or more networks. Referring to FIG. 1, transmission of environmental and physiological state data from mobile device 110 to host computer system 140 may occur via wireless network 120 and network 130, which may include the Internet.

At step 520, the environmental and physiological state data may be received by the host computer system. At step 525, the environmental data may be analyzed. This may involve analyzing one or more images captured by the mobile device. For example, various objects or locations present within the one or more images may be identified. Analyzing the environmental data may also include analyzing information from an accelerometer and/or magnetometer. Location information from a location sensor (e.g., GPS) may also be analyzed.

Based on the environmental data, a category of content may be selected at step 530 by the host computer system. For example, if the content consists of advertisements, each category of content may correspond to a different advertiser. As such, environmental data may be used to select a particular advertiser, using indications as to 1) what the user is looking at, what the user has looked at, and/or what is in the user's field of vision; 2) where the user is; and/or 3) what activity the user is or has been participating in.

At step 535, the physiological state data may be analyzed by the host computer system. Analysis may include determining a physiological state of the user. For example, states that may be identified include: tired, happy, thirsty, cold, hot, scared, stressed, angry, and sad. At step 540, using the analysis of the physiological state data at step 535, content from the previously selected category of content may be determined Referring to sample entries 300A of FIG. 3A as an example, the category of content determined at step 530 may be beverages because the environment surrounding the user contains the logo of MegaDrink. At step 540, an advertisement for a specific drink that MegaDrink produces may be selected. Continuing with the example, if the person is determined to be tired, an energy drink (e.g., highly-caffeinated soda or coffee) made by the drink manufacturer may be advertised; if the person is determined to be thirsty, a sports drink made by MegaDrink may be advertised. If the user is sad, a soft drink by MegaDrink may be advertised. If no relevant content is identified, no content may be presented to the user. If relevant content is identified, at step 545, the content may be transmitted to the mobile device. In some embodiments, content within the same category may belong to different content providers.

At step 550, the content may be received by the mobile device. In some embodiments, the content may be stored for a time. The received content may be stored at step 555. The content may be stored for a time until a trigger action is received at step 560. The trigger action may be any action that indicates the user is interacting with the mobile device. As such, it may be assured that the user is looking at and/or listening to the mobile device. In some embodiments, the trigger action may be the user providing some input that indicates the user is interested in content, such as responding to a question: "Would you like to see offers from local merchants?" Once the trigger is received, at step 565, the content may be presented to the user. In some embodiments, this may involve displaying text and/or graphics to the user and/or audio played via a speaker of the mobile device. In some embodiments, the content may be stored by the mobile device until an appropriate time to present the content. For example, the content may be stored until presented to the user while it is known the user is viewing the display, such as when the user is actively providing input to the mobile device.

In some embodiments, if the trigger action is not received within a threshold period of time after the content is received, the content may not be presented to the user and may be deleted from the mobile device. For example, if the content is received at step 550 and the user has placed the mobile device in her pocket for several minutes (or hours or some other period of time), the content may be unlikely to still be relevant to the user (e.g., the user may be miles away from the merchant that the content is related to), and thus may not be presented.

If the content is presented to the user at step 565, a presentation of content confirmation may be transmitted by the mobile device to the host computer system at step 570. As such, if the presentation of content confirmation is received at step 575, the host computer system is assured that the content was presented to the user. An indication that the content was presented to the user may be stored at step 580 by the host computer system. This indication may be used for charging the content provider for delivering the content to the user.

While data is transmitted to the host computer system to identify content to be presented to the user, it should be understood that various pieces of content may be stored by the mobile device. As such, the mobile device could collect environmental and physiological state data, analyze the environmental and physiological state data, determine content, and present such content to the end user without interaction with the host computer system. Rather, the host computer system may periodically provide various pieces of content to the mobile device which may store the content and present the content to the user when corresponding environmental and physiological state data is collected.

Figure 6:
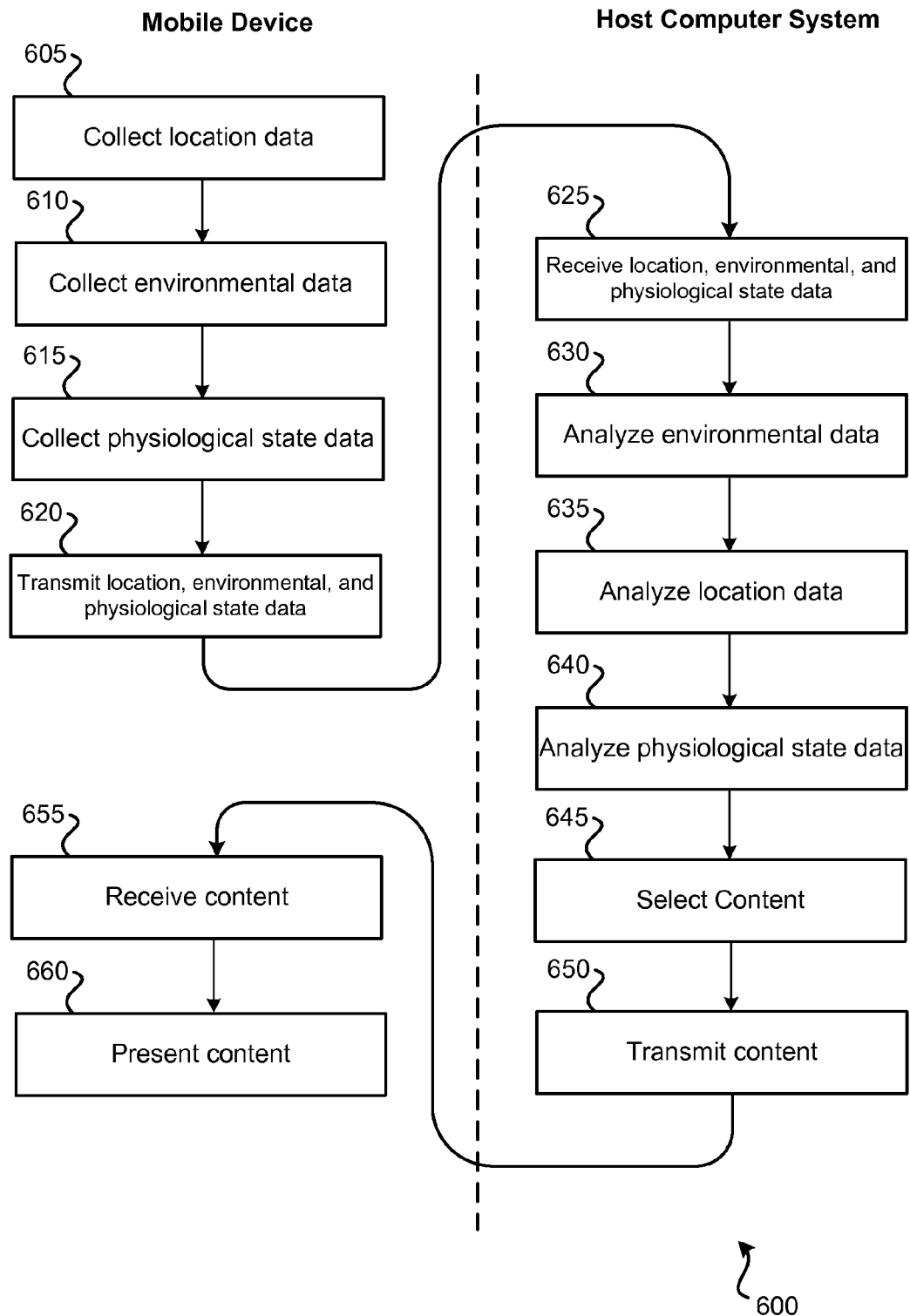
FIG. 6 illustrates another embodiment of a method for delivering relevant content to a mobile device.

FIG. 6 illustrates another embodiment of a method 600 for delivering relevant content to a mobile device. Method 600 may be performed by system 100 of FIG. 1 or by some other system for providing relevant content to a mobile device. Method 600 may use location data in addition to physiological state data and other environmental data received from the mobile device. In some embodiments, location data may be used as the only environmental data. At step 605, the mobile device may collect location data. Such location data may be determined using a GPS receiver and/or by triangulating based on cellular towers. A general location may be determined based on the location of the nearest cellular tower. Other location-determining systems may also be used by the mobile device.

At step 610, environmental data may be collected by one or more environmental sensors of a mobile device, such as mobile device 110 of FIG. 1. Environmental data may be collected via a positioning sensor (e.g., GPS), a motion sensor (e.g., accelerometer), a direction sensor (e.g., magnetometer), and/or a camera (which may be continuously capturing images or may only capture images when indicated by the user). Other types of environmental sensors may also be possible. Environmental data may be collected periodically without user interaction or when determined by the user. The environmental data may be collected at the same time, or approximately the same time, as the location data collected at step 605. For example, capturing the environmental data and the location data at approximately the same time may refer to capture of both within a window of 1 second, 5 seconds, 10 seconds, or 1 minute. Other time frames between step 605 and step 610 may also be used.

At step 615, physiological state data may be collected by one or more physiological sensors of the mobile device. Physiological state data may be gathered by electrocardiogram (ECG) sensors, galvanic skin response (GSR) sensors, plethysmography (PPG) sensors, skin temperature sensors (SKT), and/or electromyogram (EMG) sensors, to name only a handful of examples. The physiological state data may be collected at the same time, or approximately the same time, as the environmental data collected at step 610. For example, capturing the environmental data and the physiological state data at approximately the same time may refer to capture of both within a window of 1 second, 5 seconds, 10 seconds, or 1 minute. Other time frames between step 610 and step 615 may also be used.

At step 620, the location data, the environmental data, and the physiological state data may be transmitted to a host computer system. Transmission may occur via one or more networks. Referring to FIG. 1, transmission of location, environmental, and physiological state data from mobile device 110 to host computer system 140 may occur via wireless network 120 and network 130, which may include the Internet.

At step 625, the location, environmental, and physiological state data may be received by the host computer system. At step 630, the environmental state data may be analyzed by the host computer system. Analysis may include steps such as: identifying one or more objects within an image, interpreting accelerometer data, determining a physiological state of the user, determining an activity of the user, and/or determining businesses or other entities in the vicinity of the user. At step 635, the location data may be analyzed. This may involve determining content providers that are within a certain distance of the user and/or content providers in the same city, county, state, or zip code of the user. Each content provider may provide specific location limitations, such as those presented in ideal location 340 data entries of FIG. 3A.

At step 640, the physiological state data may be analyzed. Analysis may include steps such as using the physiological state data to identify a likely physiological state of the user. A physiological state identified for the user may also be associated with an intensity level. For example, if the physiological state data of the user indicates a physiological state of nervous, the user's nervous state could be associated with an intensity level of low, medium, or high based on the physiological state data. Physiological state data may be collected over a period of time and averaged (or otherwise combined) to identify the user's physiological state.

While method 600 illustrates analysis being performed by the host computer system, it should be understood that rather than transmitting raw location, environmental, and physiological state data to the host computer system, the location, environmental, and/or physiological state data may be partially or wholly analyzed by the mobile device, with results of the analysis transmitted to the host computer system. For example, rather than transmitting an image as environmental data to the host computer system, the image may be analyzed for various characteristics and only indications of the characteristics of the image (e.g., identifiers of objects present in the image, a location of the user) may be transmitted to the host computer system. Image data may contain a whole image captured by the camera, a partial image captured by the camera, and/or characteristics of an image as analyzed by the mobile device.

The analysis of the location, environmental, and physiological state data may be used at step 645 to determine what content to present to the user of the mobile device. A content database (such as content database 150-2 of FIG. 1), which may contain advertisements, may be searched to identify content that matches or most closely matches the location criteria or the environmental and physiological state data. If no relevant content is identified, no content may be presented to the user. If relevant content is identified (e.g., the ideal location, ideal environmental data, and/or ideal physiological state associated with the content in the content database is similar to the analyzed data received from the mobile device) at step 650, the content may be transmitted to the mobile device. If multiple pieces of content are identified, the most relevant piece of content may transmitted. In some embodiments, if a piece of content has been sent to the mobile device before, a different piece of content (e.g., the second closest match between the location, environmental, and physiological state data) may be presented to the user.

At step 655, the content may be received by the mobile device. At step 660, the content may be presented to the user. In some embodiments, this may involve displaying text and/or graphics to the user and/or audio played via a speaker of the mobile device. In some embodiments, the content may be stored by the mobile device until an appropriate time to present the content. For example, the content may be stored until presented to the user while it is known the user is viewing the display, such as when the user is actively providing input to the mobile device. In some embodiments, the content may be presented to the user via an augmented reality display. For example, the content may be overlaid with an image captured by the mobile device's camera.

Figure 7:
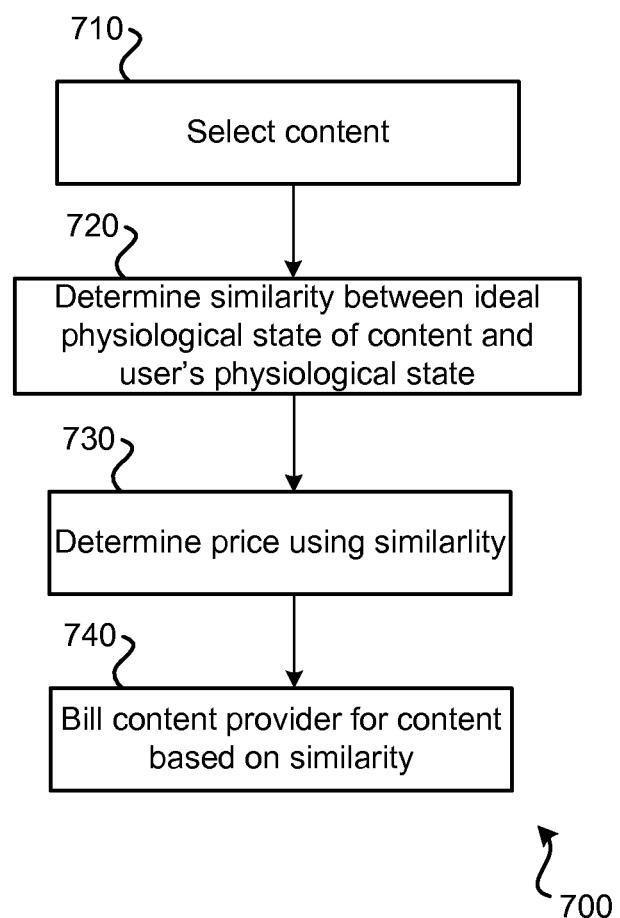
FIG. 7 illustrates an embodiment of a method for pricing content delivery to a mobile device.

FIG. 7 illustrates an embodiment of a method 700 for pricing content delivery to a mobile device. A piece of content may have a fixed price when delivered to a user. For example, the cost per impression, typically measured in thousands (CPM), may refer to a cost charged to the content provider for every thousand pieces of content delivered to users. The cost may be based on content delivered to users (e.g., step 440 of FIG. 4) or content that has been confirmed as being presented to users (e.g., step 575 of FIG. 5). In some embodiments, such as described in relation to method 700, the cost per impression may vary based on how closely the location, environmental, and/or physiological state data match an ideal location, ideal environmental, and/or an ideal physiological state set by the content provider. The closer the match, the higher the cost for the content to be sent and/or presented to the user. Method 700 may be performed by system 100 of FIG. 1 or by some other system for providing relevant content to a mobile device. Method 700 may be performed as part of methods 400, 500, 600, as part of some other method for providing relevant content to a mobile device, or as a stand-alone method. At step 710, content may be selected for delivery to a mobile device of a user. Step 710 may represent step 435 of FIG. 4, step 540 of FIG. 5, step 645 of FIG. 6, or some other step where content is selected for delivery.

At step 720, the amount of similarity between the physiological state derived from the physiological state data received from the user's mobile device and the ideal physiological state linked with the content to be delivered may be determined. The more likely the physiological state data received from the mobile device indicates the ideal physiological state specified by the content provider (such as in ideal physiological state 330 data entries of FIG. 3A), the more the content provider may be required to pay for the content to be delivered. The physiological state determined for a user may be associated with an intensity level. For example, a user's physiological state can be determined to be "slightly thirsty" or "very thirsty" based on the physiological state data. If the content provider's ideal physiological state is "thirsty," the content provider may pay more for content to be delivered to a very thirsty user than a slightly thirsty user.

Step 720 focuses on only determining the similarity between the physiological state of the user determined from the physiological state data received from the mobile device and an ideal physiological state received from the content provider. It should be understood that similar steps may also or alternatively be performed for environmental data and/or location data. Referring to location data, if the user is very close to a location specified by a content provider (e.g., 20 feet from a storefront), the cost may be higher than if the user is farther away (e.g., 200 feet from the storefront). Similarly, other environmental data may be used. For example, if the user is determined to be driving by a storefront, the cost for the content may be lower than if the user is walking by (and, thus, presumably more likely to enter the store on a whim due to content presented via the mobile device).

As such, predefined formulas may be used by the host computer system to charge content providers varying amounts based on the similarity between the content provider's desired ideal physiological state, ideal environmental data, and/or ideal location data and the physiological state data, environmental data, and location data received from the user's mobile device. The price for the content to be delivered or presented to the user may be determined at step 730.

At step 740, the content provider may be billed for the presentation or delivery of the content. The content provider may be charged for individual deliveries or presentations of content, periodically (e.g., an aggregate amount for all deliveries or presentations in a particular month), or when a certain number of deliveries or presentations is reached (e.g., a thousand). Other billing schemes are also possible. For example, a dynamic billing scheme may be arranged where the number of leads and sales due to the content presented to the user is also factored into the price to the content provider.

Figure 8:
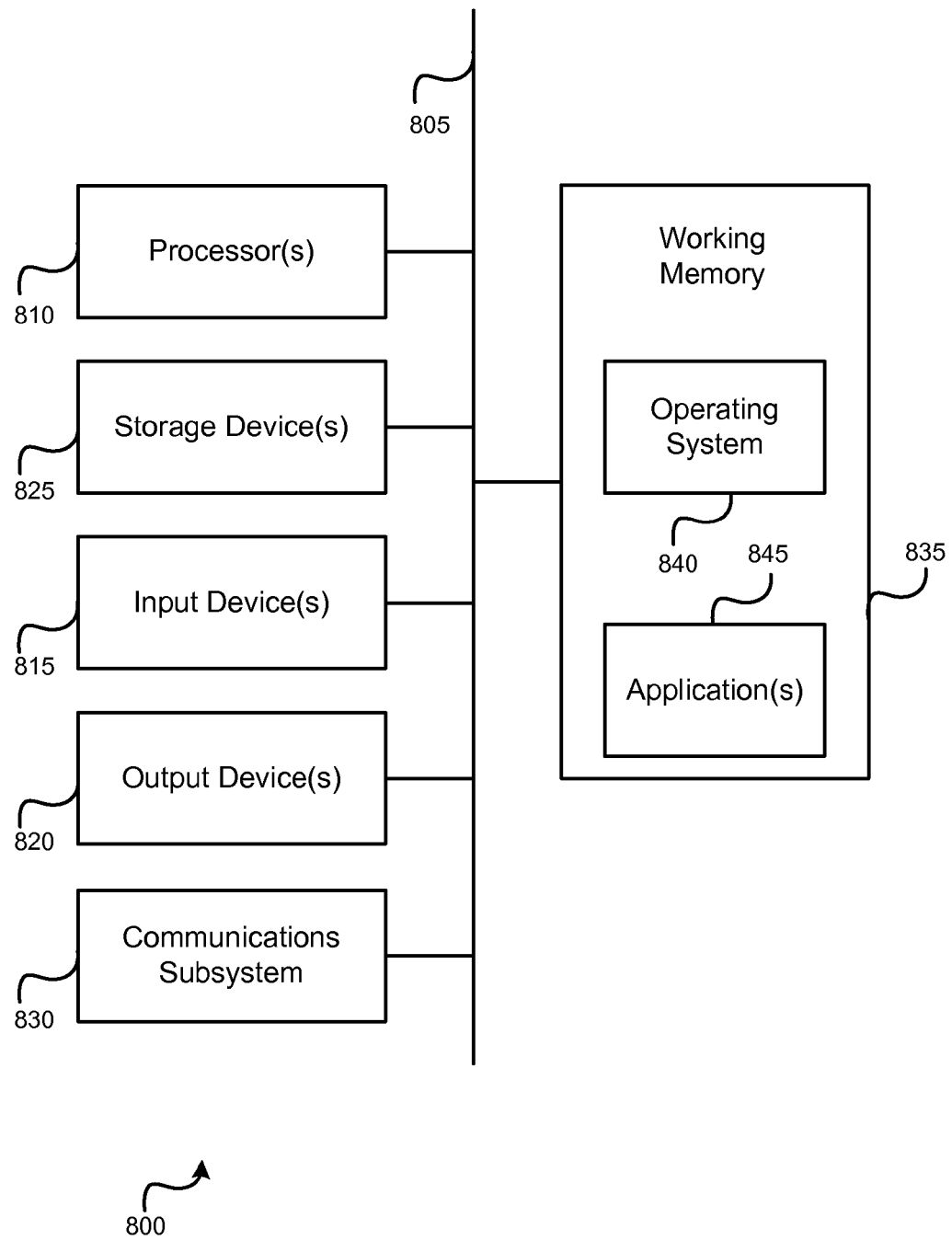
FIG. 8 illustrates an embodiment of a computer system.

A computer system as illustrated in FIG. 8 may represent the previously described computerized devices. For example, computer system 800 can represent components of the mobile devices and/or the host computer systems discussed in this application. FIG. 8 provides a schematic illustration of one embodiment of a computer system 800 that can perform the methods provided by various other embodiments. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805 (or may otherwise be in communication, as appropriate). The hardware elements may include one or more processors 810, including without limitation one or more general-purpose processors and/or one or more special-purpose processors (such as digital signal processing chips, graphics acceleration processors, and/or the like); one or more input devices 815, which can include without limitation a mouse, a keyboard, and/or the like; and one or more output devices 820, which can include without limitation a display device, a printer, and/or the like.

The computer system 800 may further include (and/or be in communication with) one or more non-transitory storage devices 825, which can comprise without limitation local and/or network accessible storage, and/or can include without limitation a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores including without limitation various file systems, database structures, and/or the like.

The computer system 800 might also include a communications subsystem 830, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 830 may permit data to be exchanged with a network (such as the network described below, to name one example), other computer systems, and/or any other devices described herein. In many embodiments, the computer system 800 will further comprise a working memory 835, which can include a RAM or ROM device, as described above.

The computer system 800 also can comprise software elements, shown as being currently located within the working memory 835, including an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 825 described above. In some cases, the storage medium might be incorporated within a computer system, such as computer system 800. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices, such as network input/output devices, may be employed.

As mentioned above, in one aspect, some embodiments may employ a computer system (such as the computer system 800) to perform methods in accordance with various embodiments of the invention. According to a set of embodiments, some or all of the procedures of such methods are performed by the computer system 800 in response to processor 810 executing one or more sequences of one or more instructions (which might be incorporated into the operating system 840 and/or other code, such as an application program 845) contained in the working memory 835. Such instructions may be read into the working memory 835 from another computer-readable medium, such as one or more of the storage device(s) 825. Merely by way of example, execution of the sequences of instructions contained in the working memory 835 might cause the processor(s) 810 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 800, various computer-readable media might be involved in providing instructions/code to processor(s) 810 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 825. Volatile media include, without limitation, dynamic memory, such as the working memory 835.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800.

The communications subsystem 830 (and/or components thereof) generally will receive signals, and the bus 805 then might carry the signals (and/or the data, instructions, etc. carried by the signals) to the working memory 835, from which the processor(s) 810 retrieves and executes the instructions. The instructions received by the working memory 835 may optionally be stored on a storage device 825 either before or after execution by the processor(s) 810.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed:

1. A mobile device comprising:
   a headpiece wearable by a user of the mobile device, the headpiece having a camera configured to capture, at a particular time, an image in the user's field of vision when the headpiece is worn by the user of the mobile device;
   a physiological sensor configured to capture data regarding the user of the mobile device;
   a positioning sensor configured to gather data regarding a location of the mobile device;
   a transceiver;
   a processor communicatively coupled to the camera, the physiological sensor, the positioning sensor, and the transceiver, wherein the processor is configured to:
      obtain, via the positioning sensor, location data of the mobile device corresponding to the particular time;
      obtain image data based on the image captured by the camera; and
      obtain physiological state data corresponding to the particular time, based on the data obtained by the physiological sensor; and a transceiver configured to:
  send, to a host computer system, the image data, the physiological state data, and the location data; and
  receive content from the host computer system,
  wherein the mobile device is further configured to provide, to the user of the mobile device, the content received from the host computer system.

2. The mobile device of claim 1, further comprising a display, wherein the mobile device is configured to provide the content received from the host computer system by displaying the content received from the host computer system on the display.

3. The mobile device of claim 1, further comprising a memory configured to store the content received from the host computer system.

4. The mobile device of claim 3, wherein the memory is further configured to store either or both of:
  an indication of how often the content received from the host computer system has been presented to the user, and
  an indication of how often the user of the mobile device has interacted with the content.

5. The mobile device of claim 1, wherein the positioning sensor includes a global positioning system (GPS) receiver.

6. The mobile device of claim 1, wherein the processor is configured to obtain the physiological state data corresponding to the particular time by analyzing the data captured by the physiological sensor over a period of time.

7. The mobile device of claim 1, wherein the camera is configured to capture the image based on input received from the user of the mobile device.

8. The mobile device of claim 1, wherein the camera is configured to capture images periodically.

9. The mobile device of claim 1, wherein the content from the host computer system is based on the image data and the physiological state data.

10. The mobile device of claim 1, wherein the characteristics are linked to one or more identified objects present in the image.

11. The mobile device of claim 1, wherein the characteristics are chosen from a group consisting of:
  a logo;
  a product; and
  a location.

12. A method of content delivery to a user of a mobile device, the method comprising:
  capturing, at a particular time, an image in the user's field of vision using a headpiece of the mobile device, wherein the headpiece comprises a camera configured to capture the image when the headpiece is worn by the user of the mobile device;
  obtaining image data based on the image captured by the camera;
  obtaining, via a positioning sensor, location data of the mobile device corresponding to the particular time;
  obtaining physiological state data corresponding to the particular time, the physiological state data indicative of a physiological state of the user of the mobile device;
  sending, from the mobile device to a host computer system, the image data, the location data, and the physiological state data;
  receiving, at the mobile device, content from the host computer system; and
  providing, to the user of the mobile device, the content received from the host computer system.

13. The method of claim 12, further comprising displaying, on a display of the mobile device, the content received from the host computer system.

14. The method of claim 12, further comprising storing, with the mobile device, the content received from the host computer system.

15. The method of claim 14, further comprising storing either or both of:
  an indication of how often the content received from the host computer system has been presented to the user, and
  an indication of how often the user of the mobile device has interacted with the content.

16. The method of claim 12, wherein the positioning sensor includes a global positioning system (GPS) receiver.

17. The method of claim 12, wherein obtaining the physiological state data corresponding to the particular time comprises analyzing the data captured by a physiological sensor over a period of time.

18. The method of claim 12, further comprising capturing the image based on input received from the user of the mobile device.

19. The method of claim 12, further comprising capturing images with the camera periodically.

20. The method of claim 12, wherein the content from the host computer system is based on the image data and the physiological state data.

21. An apparatus comprising:
  means for capturing, at a particular time, an image in a field of vision of a user of the apparatus, wherein the means for capturing is configured to capture the image when worn by the user of the apparatus;
  means for obtaining location data of the mobile device corresponding to the particular time;
  means for obtaining image data based on the captured image;
  means for obtaining physiological state data corresponding to the particular time, the physiological state data indicative of a physiological state of the user of the apparatus;
  means for sending the image data, the location data, and the physiological state data to a host computer system;
  means for receiving content from the host computer system; and
  and means for providing, to the user of the apparatus, the content received from the host computer system.

22. The apparatus of claim 21, further comprising means for displaying the content received from the host computer system.

23. The apparatus of claim 21, further comprising means for storing, the content received from the host computer system.

24. The apparatus of claim 23, further comprising means for storing either or both of:
  an indication of how often the content received from the host computer system has been presented to the user, and
  an indication of how often the user of the apparatus has interacted with the content.

25. The apparatus of claim 21, wherein the means for obtaining the physiological state data corresponding to the particular time comprises means for analyzing the data captured by a physiological sensor over a period of time.

26. The apparatus of claim 21, wherein the means for capturing the image are configured to capture the image based on input received from the user of the apparatus.

27. The apparatus of claim 21, further comprising periodically capturing images with the means for capturing.

28. The apparatus of claim 21, wherein the content from the host computer system is based on the image data and the physiological state data.

29. A non-transitory computer-readable medium having instructions stored thereon for delivering content to a user of a mobile device, the instructions configured to cause a processor to:
- capture, at a particular time, an image in the user's field of vision using a headpiece of the mobile device, wherein the headpiece comprises a camera configured to capture the image when the headpiece is worn by the user of the mobile device;
- obtain location data of the mobile device corresponding to the particular time;
- obtain image data based on the image captured by the camera;
- obtain physiological state data corresponding to the particular time, the physiological state data indicative of a physiological state of the user of the mobile device;
- send, from the mobile device to a host computer system, the image data, the location data, and the physiological state data;
- receive, at the mobile device, content from the host computer system; and
- provide, to the user of the mobile device, the content received from the host computer system.

30. The computer-readable medium of claim 29, further comprising instructions configured to cause the processor to display, on a display of the mobile device, the content received from the host computer system.

31. The computer-readable medium of claim 29, further comprising instructions configured to cause the processor to store, using a memory the mobile device, the content received from the host computer system.

32. The computer-readable medium of claim 29, wherein the content from the host computer system is based on the image data and the physiological state data.

* * * * *